United States Patent [19]

Rea et al.

[11] Patent Number: 4,606,820
[45] Date of Patent: Aug. 19, 1986

[54] DUPLEX STRAINER

[75] Inventors: David B. Rea; Alexander B. Mann, both of Erie, Pa.

[73] Assignee: R-P & C Valve, Inc., Fairview, Pa.

[21] Appl. No.: 665,711

[22] Filed: Oct. 29, 1984

[51] Int. Cl.[4] .................... B01D 29/30; B01D 35/12
[52] U.S. Cl. .................... 210/130; 210/137; 210/340; 210/424; 137/625.47; 251/283
[58] Field of Search .............. 210/340, 418, 420, 421, 210/424, 450, 456, 130, 133, 137; 137/599, 599.1, 625.47; 251/283, 356, 359, 364, DIG. 1

[56] References Cited

U.S. PATENT DOCUMENTS

| | | | |
|---|---|---|---|
| 2,239,795 | 4/1941 | Parker | 251/283 |
| 2,945,668 | 7/1960 | Staller et al. | 251/283 |
| 3,397,784 | 8/1968 | Carr | 210/108 |
| 3,618,781 | 11/1971 | Brown | 210/341 |
| 3,679,060 | 7/1972 | Smith | 210/333 |
| 3,757,956 | 9/1973 | Bradel et al. | 210/333 |
| 3,768,654 | 10/1973 | Pearce | 210/232 |
| 3,900,401 | 8/1975 | Oliver et al. | 210/341 |
| 3,935,108 | 1/1976 | Forgues | 210/340 |
| 4,035,295 | 7/1977 | Pluequet | 210/341 |
| 4,103,868 | 8/1978 | Thompson | 251/283 |
| 4,174,092 | 11/1979 | Macleod | 251/283 |
| 4,496,463 | 1/1985 | Desai et al. | 210/424 |

OTHER PUBLICATIONS

The Andale Bulletin, 656-R1, (Series 104 Duplex Strainers).

Primary Examiner—Richard V. Fisher
Assistant Examiner—Wanda L. Millard
Attorney, Agent, or Firm—Wayne L. Lovercheck; Charles L. Lovercheck; Dale R. Lovercheck

[57] ABSTRACT

A strainer for trapping solid particles entrained in a fluid flowing through the strainer includes a two-chambered housing, each chamber containing a removable strainer basket. The strainer also includes a plurality of valve mechanisms for routing fluid flow through the two chambers in a predetermined manner. A user actuated directional flow control valve includes a multi-ported ball member rotatably supported by and between a pair of opposed valve seat plates, each associated with a respective one of the chambers wherein rotation of the ball directs fluid flow through it into one or the other or both of the chambers. An optional seal member, engageable with the ball, acts at a predetermined position of the ball member to block inlet fluid flow through any of the ports in the ball member thereby providing a shut off condition. A pair of spring biased, normally closed, check valves are used to automatically control the flow of strained fluid out of the strainer chambers.

17 Claims, 11 Drawing Figures

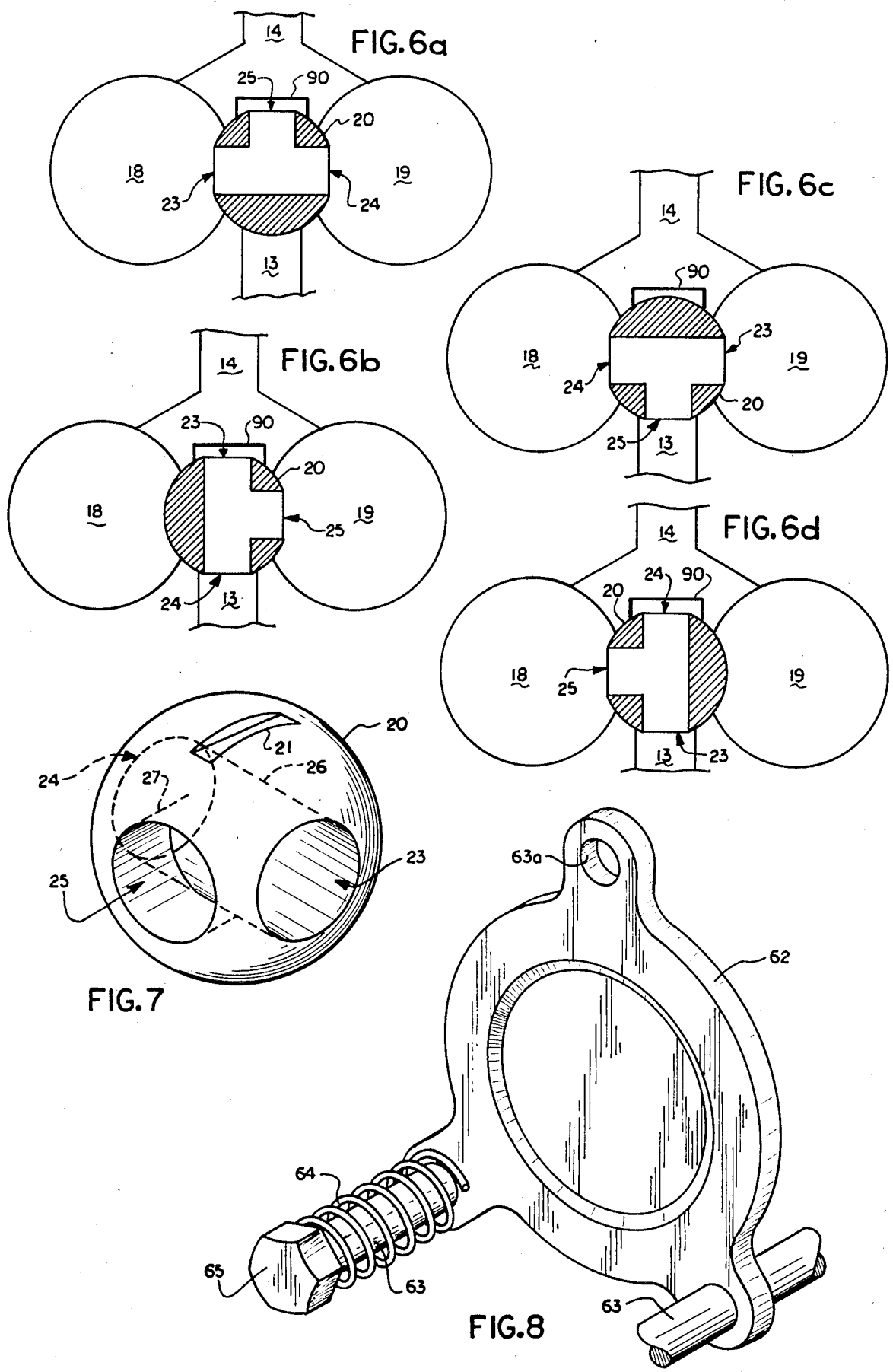

DUPLEX STRAINER

BACKGROUND OF THE INVENTION

The present invention relates in general to fluid flow control devices, and in particular to a dual basket or duplex strainer for trapping solid particles entrained in fluid flowing through the strainer.

U.S. Pat. Nos. 3,679,060; 3,757,956 and 3,768,654 disclose prior art dual basket strainers, each having a single, user actuated, control mechanism for directing fluid flow through one or the other of a pair of removable strainer baskets contained in respective chambers of the strainer housing. Such a feature allows a clogged strainer basket to be removed for cleaning as fluid flow through the strainer continues via the other strainer basket.

The noted prior art strainer control mechanisms each include an inlet valve mechanism in fluid communication between a strainer inlet and the strainer basket containing chambers, and an outlet valve mechanism in fluid communication between the chambers and a strainer outlet. Both valve mechanisms are user actuated by a common control shaft wherein fluid communication between the inlet, the outlet, and a selected one of the strainer chambers is dependent upon the position of the control shaft.

It can be appreciated that such prior art strainer control mechanisms are relatively complex and therefore expensive to manufacture, and may, because of their complexity, be prone to seal leakage. Further, the force required to simultaneously operate bolh valve mechanisms by means of a single control shaft may be relatively high so as to make difficult the operation of the strainer. Also, relatively complex, user actuated, dual valve strainer control mechanisms can be difficult to maintain.

Accordingly, it is a primary aim of the present invention to provide a dual basket strainer which overcomes each of the aforementioned shortcomings without offsetting disadvantages.

SUMMARY OF THE INVENTION

In accordance with the present invention, a duplex strainer includes a housing having a first chamber and a second chamber, the housing also having an inlet and an outlet to provide fluid to, and to convey fluid from, the chambers. Strainer means mounted in each of the chambers strains fluid flowing therethrough. A user actuated, directional flow control valve means is inserted in fluid communication between the inlet and the chambers. The flow control valve means directs fluid flow from the inlet to one or the other or both chambers to cause fluid flow through the strainer means.

A normally closed valve means is inserted in fluid communication between each of the chambers and the outlet. The normally closed valve means automatically opens to permit fluid communication between the associated chamber and the outlet only when the fluid pressure in the associated chamber exceeds the fluid pressure in the outlet by a predetermined degree, wherein strained fluid can flow from one or the other or both of the chambers into the outlet.

Preferably, the directional flow control valve means is constituted by a ball valve having a multiported ball member rotatable through a plurality of positions. Rotation of the ball member provides fluid flow from the inlet, via the ports of the ball member, into one or the other or both of the first and second chambers provided by the housing.

The normally closed valve means is constituted by a pair of check valves that permit fluid flow from the chambers to the outlets, but preclude reverse fluid flow from the outlet into either of the chambers.

As an option, the strainer can include a seal means that is engageable with the multi-ported ball member at a predetermined rotational position thereof. The seal means will preclude fluid flow through any ports of the ball member when at the said predetermined rotational position wherein a shut off condition of the strainer is provided.

BRIEF DESCRIPTION OF THE DRAWINGS

A fuller understanding of the invention may be had by referring to the following description and claims taken in conjunction with the accompanying drawings, wherein:

FIGS. 6a–6d are schematic diagrams of the strainer in accordance with the present invention at various operative positions;

FIG. 7 is a perspective view of a ball valve member utilized in practicing the invention and FIG. 8 is a perspective view, with portions cut-away, of a check valve member utilized in practicing the present invention.

DETAILED DESCRIPTION OF THE PREFERRED EMBODIMENT

Figure 1:
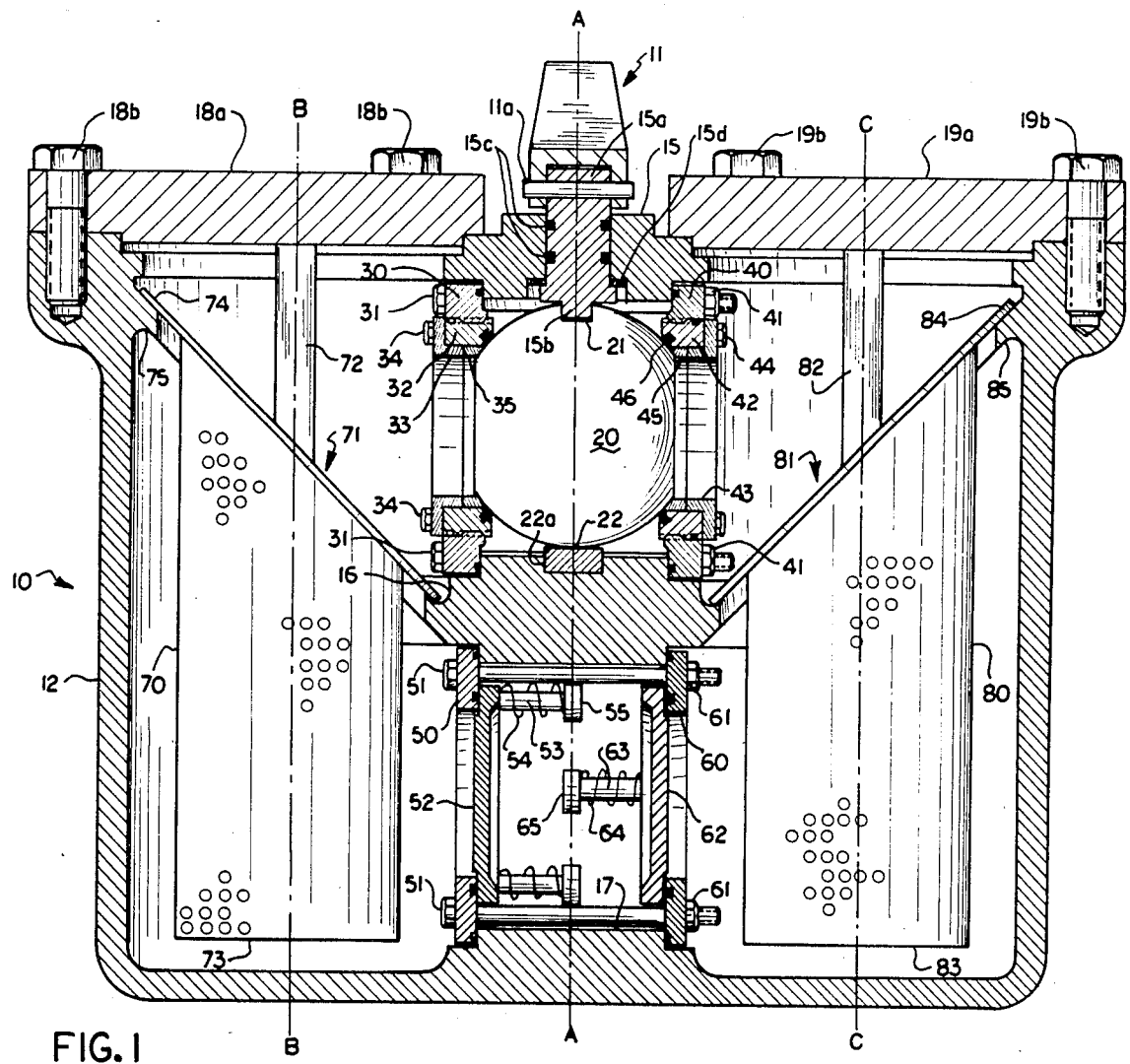
FIG. 1 is an elevation view in vertical cross section of a strainer in accordance with the invention, the strainer being in a shut-off condition.
Figure 2:
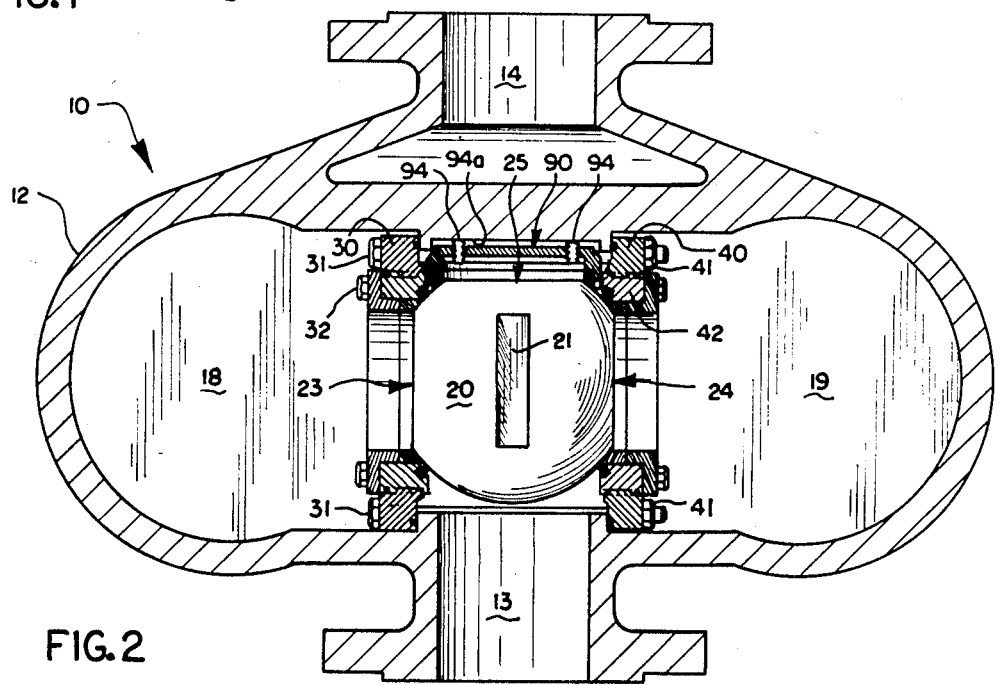
FIG. 2 is a plan view in horizontal cross section of the strainer of FIG. 1.

With reference to FIGS. 1 and 2, a dual basket or duplex strainer 10 in accordance with the present invention includes a cast metal housing 12 which provides a fluid inlet 13 and a fluid outlet 14. The interior volume of the housing 12 is divided approximately in half by a plurality of valve mechanisms lying along an axis A—A as illustrated in FIG. 1, such valve mechanisms to be subsequently discussed in greater detail. A left half of the housing 12 provides a generally cylindrical first chamber 18 lying along a first chamber axis B—B, while the right half of the housing 12 provides a generally cylindrical second chamber 19 extending along a second chamber axis C—C. The axes A—A, B—B and C—C are parallel to each other as illustrated.

The open top ends of the left and right chambers 18, 19 are closed respectively by a first metal cover 18a secured in position by a plurality of bolts 18b, and a second metal cover 19a, also secured by a corresponding plurality of bolts 19b as illustrated. The covers 18a, 19a are removable to permit access into the chambers 18, 19 which contain removable strainer means as will be subsequently discussed. The inlet 13 provides fluid to the top of one or the other or both of the chambers 18, 19 while the outlet 14 (via vertical outlet conduit 14a - see FIG. 3) conveys fluid out of and away from the bottom of such chambers 18, 19.

Inserted in fluid communication between the inlet 13 and the chambers 18, 19, in accordance with the present invention, is a user actuated directional flow control valve means in the form of a ball valve mechanism including of a multi-ported ball member 20 rotatable on axis A—A as illustrated in FIG. 1. With reference to FIG. 7, the ball member 20 is most clearly illustrated as including a diametrically extending cross bore 26 providing a first port 23 and a diametrically opposed second port 24. The ball member 20 further includes a radially extending bore 27 providing a third port 25, the radially extending bore 27 intersecting the cross bore 26 in perpendicular fashion at the cross bore midpoint to provide fluid communication among all three ports 23, 24, 25. The diametrically opposed ports 23, 24 are each respectively offset by ninety degrees (90°) from the port 25.

Figure 3:
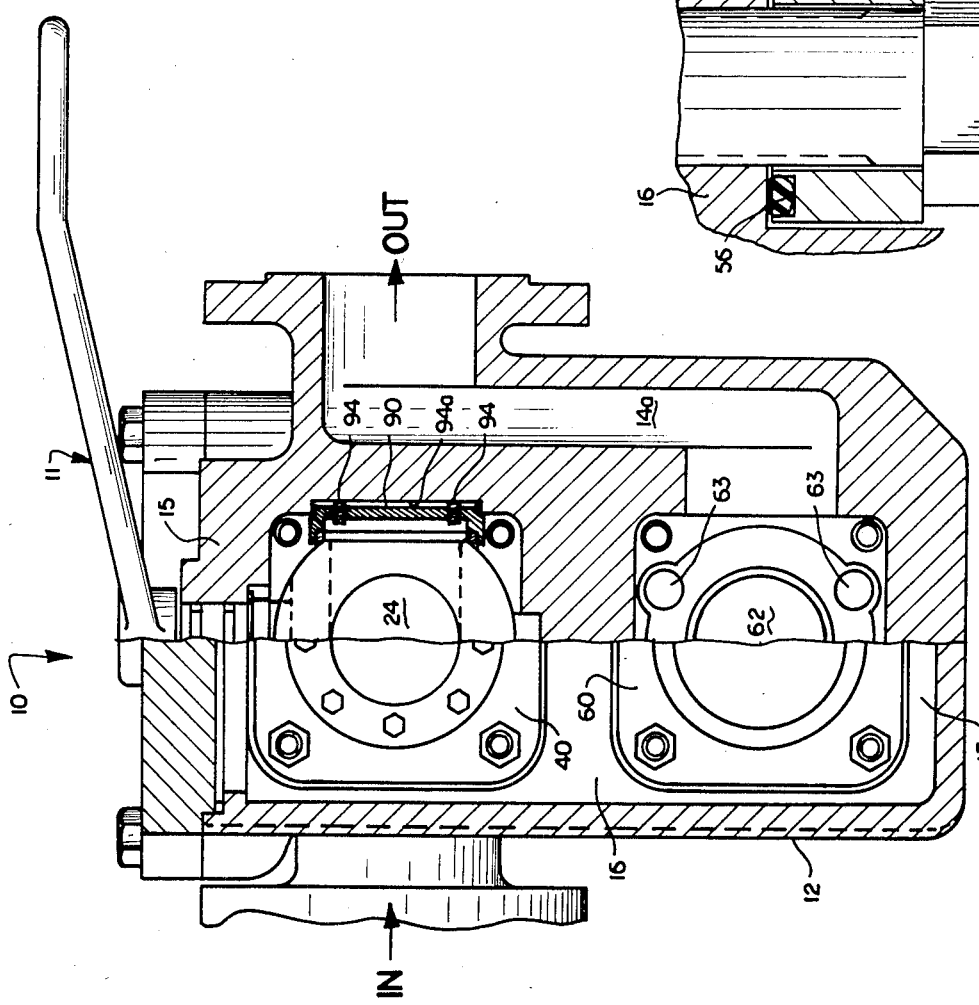
FIG. 3 is a sectional cross section view of a seal area of a valve portion of the strainer of FIG. 1.

With further reference to FIGS. 1 through 3, the ball 20 is located below a top cross piece 15, and above a middle cross piece 16, the cross pieces 15, 16 forming integral portions of the cast metal housing 12. The ball member 20 is positioned between and rotatably supported by a first valve seat plate 30 and an opposed second parallel valve seat plate 40, the plates 30, 40 are generally identical to each other, the plates 30, 40 having rectangular outer peripheries and central circular apertures for receiving respectively a first seal supporting ring 32 and a second seal supporting ring 42, these rings 32, 42 supporting seal members that engage in fluidtight relationship with the rotatable ball member 20 as will be subsequently explained. The opposed plates 30, 40 are spaced from each other by a distance less than the diameter of the ball member 20 as illustrated. It can be seen that the top cross piece 15 and middle cross piece 16 of the housing 12 in combination with a first and second valve seat plates 30, 40 provide, in further combination with a vertical housing wall 94a, a boxlike structure for retaining therein at a center position the rotatable ball member 20, the interior of such boxlike structure being in fluid communication with the inlet 13.

The ball member 20 rests upon and is supported by a fixed bearinglike pad 22 which in turn is received in a recess 22a in the upper middle surface of the middle cross piece 16 as illustrated. As noted earlier, the ball member 20 is further supported in its position by the valve seat plates 30, 40 that are fixed in position relatively to each other and to the housing cross pieces 15, 16 by a plurality of through bolts 31 that extend across the axis A—A, from left to right, for engagement with a corresponding plurality of through bolt nuts 41 as illustrated. In assemblying the strainer 10, the nuts 41 are tightened to an affect clamp, the plates 30, 40 in position while still allowing relatively free rotation of the ball member 20. While the bottom of the ball member 20 rests on the pad 22, the top of the ball member includes a rectangular slot or recess 21 (see FIGS. 2 and 7). The intermediate portion of the top cross piece 15 provides a bore which receives a rotatable ball driving shaft 15a having at its lower or distal end a screw driver like blade 15b that is received into the recess 21 in the ball member 20. Fluid leakage between the shaft 15a and the bore in the top cross piece 15 is precluded by a pair of O-ring type seals 15c of a conventional type. The shaft 15a is held in its downward position against inlet fluid pressure by a locking ring 15d in the form of a C-clip that can be snapped around the shaft 15a at a position above a lower flange portion of the shaft 15a as illustrated.

Fixed to the top end of the shaft 15a is a user grippable handle 11 (shown most clearly in FIG. 3) that is rotationally fixed to the shaft 15a by a locking pin 11a (see FIG. 1). Thus, handle 11 can be rotated through three hundred and sixty degrees (360°) wherein ball member 20 as will be illustrated in greater detail provides a fluid communication path from the inlet 13 to either chamber 18 or chamber 19 or both.

With reference to the lower central portion of FIG. 1, outlet control valve means is provided below the middle cross piece 16 of the housing 12 and an integral bottom cross piece 17 thereof. The outlet control valve means includes a pair of normally closed check valves comprised of a first check valve seat plate 50 and an opposed second check valve seat plate 60, the plates 50, 60 being generally identical to each other and held in position relative to the housing cross pieces 16, 17 by a plurality of through bolts 51 (crossing axis A—A) having their threaded ends engaged by the corresponding plurality of nuts 61. Upon tightening of such nuts the plates 50, 60 are pulled toward each other to lock or clamp them in position against portions of the cross pieces 16, 17 as illustrated.

The first check valve seat plate 50 has a rectangular outer periphery and a circular inner periphery constituting a fluid conduit for providing fluid communication between the chamber 18 and the outlet 14. In a similar fashion, the second check valve seat plate 60 has a rectangular outer periphery and a circular inner periphery constituting a fluid conduit for providing fluid communication between the second chamber 19 and the outlet 14.

The central circular aperture of check valve seat plate 50 is normally closed by a first poppet type, disc shaped, valve member 52 which can sealingly engage with plate 50 to close the central aperture therein. In a similar fashion, the central aperture of plate 60 can be closed by a second poppet type, disc shaped valve member 62. With particular reference to FIG. 1 and FIG. 8, the disc shaped poppet member 62 includes three peripherally extending tab portions providing through bores 63a that slidably receive in relatively close tolerance a corresponding plurality of three posts 63 that are threaded into and fixed to the associated check valve seat plate 60, the posts 63 and bores 63a being circumferentially spaced at one hundred twenty degree (120°) intervals about the disc shaped valve member 62. A corresponding plurality of three biasing springs 64 ride on each of the posts 63. It can be seen that the springs 63 are trapped between the respective heads 65 of the post 64 and the poppet member 62 that slides along the posts 63.

With particular reference to FIG. 1, the poppet type valve member 62 has associated with it three posts 63 (only one shown in FIG. 1 , while in a similar fashion, poppet member 52 has three posts 53 associated with it, the posts 53, with heads 55, also being circumferentially spaced at one hundred twenty degree (120°) intervals about the periphery of the disc shaped valve member 52. The sets of three posts 53, 63 are offset from each other by sixty degrees (60°) so that the posts 63, 53 do not interfere with each other.

In operation, a fluid pressure build up (usually liquid, but possibly gas) in chamber 18 exceeding that of the pressure in the outlet 14 will, if of a predetermined amount, automatically force poppet type valve member 52 to break its seat with the associated first check valve seat plate 50 so that fluid communication is established between chamber 18 and outlet 14. In a similar fashion, fluid pressure build up in chamber 19 will cause poppet type valve member 62 to disengage from its associated second check valve seat plate 60 so that fluid communication is established between chamber 19 and outlet 14. The springs 54, 64 bias the valve members 52, 62 in a closed position as illustrated so that fluid back flow from the outlet 14 into the chambers 18, 19 is precluded.

Thus, depending upon the position of the ball member 20 as will be subsequently illustrated, fluid flow from inlet 13 is provided to either chamber 18 or 19 or both, the appropriate poppet type valve members 52 or 62 opening to convey fluid from the chambers 18, 19 to the outlet 14.

Fluid flowing through chamber 18 passes from top to bottom through strainer means in the form of a first cylindrical strainer basket 70 having an open slanted top end 71 supporting a looplike handle 72 and a closed bottom end 73. The slanted top end 71 of the basket is defined by a radially extending elliptically shaped lip 74 that rests on and is supported by a corresponding elliptically shaped support flange 75 provided by the housing 12. In a similar fashion, the second chamber 19 contains a generally identical second cylindrical strainer basket 80 having an open top end 81 supporting a looplike handle 82 and a closed bottom end 83. A second elliptical lip 84 radially extends from the top open end of the basket 80 and rests upon and is supported by a second elliptical support flange 85. The strainer baskets 70, 80 are conventional in design and well known in the art being formed of perforated or foraminous sheet metal or screen mesh so that fluid containing particulates enters the top of the baskets 70, 80 and is strained so that only strained, particulate free fluid flows through open poppets 52, 62. The baskets 70, 80 are removable for cleaning particulates therefrom via the open top of the housing 12 when covers 18a, 19a are removed as discussed earlier. The basket handles are of such a vertical height that the covers 18a, 19a a press down on the handles, which being resilient force down, and hold the baskets 70, 80 and their flanges 74, 84 in generally fluidtight relation with the housing flanges 75, 85.

Figure 4:
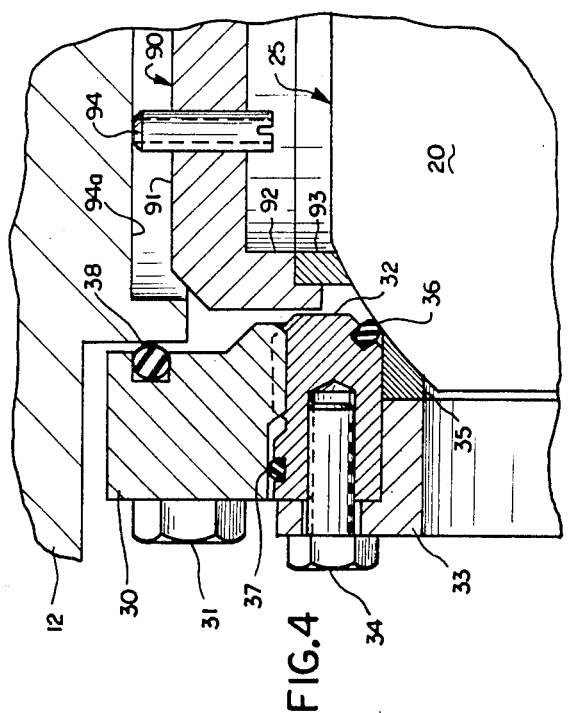
FIG. 4 is a sectional cross section view of a seal area of another valve portion of the strainer of FIG. 1.

With particular reference to FIGS. 2-4, an optional cuplike shut off seal 90 is provided. As will be subsequently illustrated, element 90, if not used, precludes the strainer from being placed in a shut off condition. With optional shut off seal 90 in position, an operator can rotate handle 11 to place ball member 20 in its illustrated position so that flow through any of the ports 23, 24, 25 of the ball 20 into either chamber 18 or 19 is precluded wherein a shut off condition is provided. The cuplike shut off seal 90 includes a circular base portion 91 which provides at its periphery a circular lip portion 92 in turn providing an O-ring type circular lip seal 93 that is slidingly engageable in fluidtight relation with the ball member 20, the shut off seal 90 being biased against the ball member 20 by means of a plurality of set screws 94 (e.g. four) which bear on the vertical wall portion 94a of the housing 12. The seal 93 has a diameter slightly greater than the diameter of any port in the ball 20 so that the shut off seal 90, due to lip seal 93, can seal off a port of the ball 20 when aligned with the cuplike seal 90 as illustrated most clearly in FIG. 2. It can be appreciated that without shut off seal 90 in position, fluid communication into port 25 from outlet 13 is established.

With particular reference to FIG. 4, the fluidtight engagement of the valve plate 30 with the housing 12 and ball member 20 is more clearly illustrated. The outer periphery of valve seat plate 30 is provided on its inner or rightward side with a rectangular elastomeric seal 38 that engages associated rectangular portions of the housing 12 to establish a fluidtight relationship between the housing 12 and the valve seat plate 30. The valve seat plate 30 as noted earlier has a circular central aperture to which is fixed by suitable means a seal supporting ring 32, a circular O-ring type seal 37 being positioned in fluidtight relation between the ring 32 and the plate 30 to preclude fluid leakage between them. A circular main seal biasing ring 33 is fixed to the support ring 32 by a plurality of bolts 34, the biasing ring 33 bearing on a circular main seal 35 that engages the ball 20 in fluidtight relation. It is recognized that like the earlier discussed lip seal 93 supported by the shut off seal 90, the diameter of the main seal 35 is greater than the diameter of any of the ports 23, 24, 25 of the ball member 20 so that when a port is properly aligned relative to the main seal 35, fluid communication is established between such port and the first chamber 18 (see FIG. 2). The seal supporting ring 32 also supports a back up seal 36 preferably formed for example of polytetraflouroethylene. It should be recognized that corresponding seal elements are provided in association with the second valve seat plate 40 which, as noted earlier, is generally identical to the first valve seat plate 30 and its associated elements.

Back up seal 36 allows the removal and replacement of main seal 35 while fluid continues to flow through the strainer via chamber 19. Where changing of seal 35 is required, handle 11 (see FIGS. 1 and 3) is moved to a position wherein fluid flow only occurs through chamber 19 as will be subsequently illustrated. In such a condition, and with particular reference to FIG. 1 cover 18a can be removed wherein strainer basket 70 is withdrawn and removed permitting access to bolls 34.

When such bolts are removed, the seal biasing ring (FIG. 4) can be extracted wherein main seal 35 can be removed and replaced. Main seal biasing ring 33 is then reinserted and bolts 34 are again used to lock the biasing ring 33 in position to hold the new seal 35 against the ball 20. It will be recognized that during such seal changing operation the back up seal 36 precludes fluid leakage from the inlet 13 about the ball member 20 into chamber 18. Once basket 70 has been reinserted and cover 18a has been secured, chamber 18 can once again be used for straining incoming fluid. With particular reference to FIG. 1, it will be recognized that the main seal member 45 associated with valve seat plate 40 could also be changed in a similar manner by diverting fluid flow solely through chamber 18 wherein cover plate 19a and basket 80 are removed to permit access to bolts 44 which retain a second seal biasing ring 43 in position against a second main seal 45 associated with a second back up seal 46.

Figure 5:
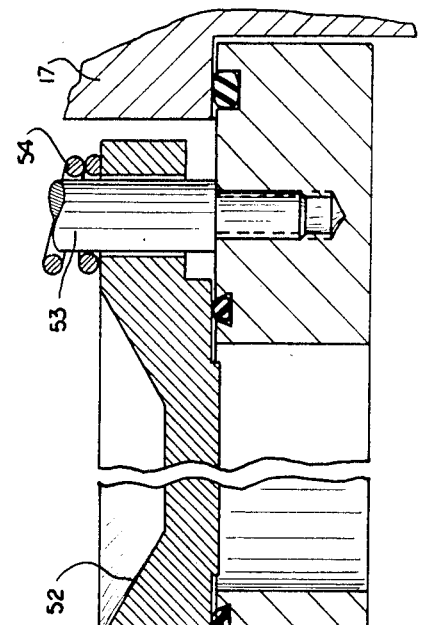
FIG. 5 is a sectional cross section view of a seal area of still another valve portion of the strainer of FIG. 1.

With particular reference to FIG. 5, a fluidtight relation is established between the rectangular periphery of the first check valve seat plate 50 and the housing cross pieces 16, 17, and other vertical portions of the housing 12 by a rectangular elastomeric type seal 56 maintained in position in a groove in the periphery of the plate 50 as illustrated. The poppet member 52 in its closed condition engages with a circular O-ring type seal 57 that is received in a dove tail type groove provided about the circular aperture in the central portion of the plate 50.

Thus, the seals 56, 57 insure that fluid cannot leak between chamber 18 (FIG. 1) and the outlet 14 when poppet type valve member 52 is in its closed position as illustrated.

The operation of the strainer 10 in accordance with the present invention can now be discussed with regard to FIGS. 6a through 6d. FIG. 6a schematically illustrates the condition of the strainer 10 as it is shown in FIGS. 1 through 5 as discussed earlier. The strainer is in a shut off condition wherein optional cuplike seal 90 blocks flow into port 25. It is recognized that if shut off seal 90 were not used, fluid flow from outlet 13 into port 25 would occur wherein both chambers 18 and 19 would be provided via ports 23 and 24 with fluid so that straining through both chambers 18, 19 would occur, the outlet 14 receiving strained fluid therefrom.

With reference to FIG. 6b, ball member 20 has been rotated clockwise by ninety degrees (90°) wherein fluid communication is established between the inlet 13 and chamber 19 via ports 24, 25. In this condition, only chamber 19 receives inlet fluid and chamber 18 does not wherein if desired the strainer means, i.e. the strainer basket in chamber 18 can be removed and cleaned as discussed earlier.

With reference to FIG. 6c, the ball member 20 has been rotated another ninety degrees (90°) clockwise wherein it can be seen that port 25 receives inlet fluid which in turn flows out of ports 23 and 24 into chambers 19 and 18 respectively. In this condition, straining is provided in both chambers 18 and 19 although such a position is usually not utilized.

Finally, with reference to FIG. 6d, the ball member 20 has been rotated another ninety degrees (90°) clockwise wherein inlet fluid is provided into port 23 and out of port 25 into chamber 18. In this condition, chamber 19 is not utilized wherein the strainer means contained therein can be cleaned. It will be recognized that during the transition for example from FIG. 6a to 6b, 6b to 6c, 6c to 6d or 6d to 6a temporary cross flow fluid communication is provided between chambers 18 and 19 so that transitional flow from one chamber to the other or to a shut off condition occurs gradually thus avoiding undesirable back pressure fluctuations in inlet 13.

From the foregoing, it can be seen that a relatively simple valving mechanism for regulating flow through the strainer chambers 18 and 19 is provided. Further, unlike the prior art, a relatively simple, optional, floating type shut off seal 90 is provided to provide a shut off condition for the strainer. Finally, it will be recognized that the use of simple check valve mechanisms constituted in part by poppet type valve members 52, 62, and a relatively simple ball valve mechanism constituted by ball member 20 and associated valve seat plates 30, 40 provide a highly reliable strainer structure. With reference to check valve members 52, 62, it should also be noted that associated biasing springs 54, 64 could be eliminated, and valve members 52, 62 could be connected to each other by a link means so that the outlet valve mechanism could function as a shuttle valve as opposed to the illustrated independently operable check valves. In a shuttle valve configuration, the strainer could be used for example on the suction side of a pump so as to preclude the need for head pressure in either of the chambers 18 or 19.

Although the preferred embodiment of this invention has been shown and described, it should be understood that various modifications and rearrangements of the parts may be resorted to without departing from the scope of the invention as disclosed and claimed herein.

What is claimed is:

1. A strainer for trapping particles entrained in a fluid flowing through the strainer comprising:
   a housing having means defining a first chamber and a second chamber,
   the housing having means defining an inlet and an outlet to provide fluid to, and to convey fluid from, the chambers,
   the chambers being generally cylindrical and lying in spaced, side-by-side relationship along generally parallel chamber axes;
   strainer means mounted in each of the chambers to strain fluid flowing through the chambers;
   a user actuated ball valve mechanism positioned between the cylindrical chambers at one end thereof,
   the ball valve mechanism including a multi-ported ball member rotatable on a ball axis parallel to the chamber axes,
   the inlet being in fluid communication with the ball valve mechanism wherein fluid flow is directed, via the ports of the ball member, fron the inlet to one or the other or both of the chambers, depending upon the rotational position of the ball, wherein fluid flows through the strainer means,
   outlet control valve means allowing fluid flow from said chambers into said outlet,
   a pair of opposed, parallel, valve seat plates, each having a central circular aperture therein,
   one of the valve seat plates having an outer side in fluid communication with the first strainer means containing chamber,
   the other valve seat plate having an outer side in fluid communication with the second strainer means containing chamber,
   the inner sides of the valve seat plates being separated by a distance less than the diameter of the ball member,
   the ball member being received by the circular apertures in the valve plates and being located between and rotatably supported by the valve seat plates,
   fluid flow from the inlet to the chambers occurring only through central apertures of the valve plates when fluid communication is established between ports of ball member and the central apertures of the valve plates.

2. A strainer according to claim 1, wherein said outlet control valve means is constituted by a first check valve positioned in fluid communication between said first chamber and said outlet, and a second check valve positioned in fluid communication between said second chamber and said outlet.

3. A strainer according to claim 2, wherein each of said check valves is a spring biased normally closed valve which opens to establish fluid communication between an associated one of said chambers and said outlet when fluid pressure in said associated one of said chambers exceeds the fluid pressure in the outlet by a predetermined amount.

4. A strainer according to claim 3, said check valves each including a check valve seat plate having a central circular aperture therein, a circular disc engageable in fluidtight relationship with the check valve seat plate about the periphery of said aperture, and a plurality of spring members biasing said disc against said plate, fluid pressure in said plate acting to force the disc against said spring members to break the normal fluidtight relation between the disc and the said plate wherein fluid communication between the associated chamber and the outlet is established.

5. A strainer according to claim 4, including an O-ring type seal member mounted on each of said check valve seat plates and engageable in fluidtight relationship with said disc.

6. A strainer according to claim 4, including seal means mounted on and extending about the outer periphery of each of the check valve seat plates, the seal means engaging said housing to preclude fluid leakage between said check valve seat plates and said housing, said check valve seat plates being secured in fixed relation to said housing.

7. A strainer according to claim 1, including seal means engageable with said ball at a predetermined rotational position thereof, the seal means precluding fluid flow through any of the ports of the ball when at said predetermined rotational position wherein a shut off condition of the strainer is provided.

8. A strainer according to claim 7, wherein said seal means is a cuplike member having a base portion and a lip portion, an O-ring type seal being carried by the lip portion of the cup, the O-ring type seal being engaged in fluidtight relation by the ball, the ball being movable relative to the cuplike member which remains in a generally fixed position relative to the housing said cuplike member being exposed to fluid in said inlet.

9. A strainer according to claim 8, wherein said cuplike member is adjustably biased against said ball by screw means extending between said cuplike member and said housing.

10. A strainer according to claim 1, wherein seal means mounted on each of said valve seat plates, and extending about the periphery of each of said circular apertures, engages said ball in fluidtight relation to preclude fluid leakage between said ball and said valve seat plates as said ball moves relative to said vlave seat plates.

11. A strainer according to claim 10, wherein said circular seal means includes a primary O-ring type seal member exposed to fluid in said chambers and a secondary back up O-ring type seal member isolated from fluid in said chambers by said primary O-ring type seal member until said primary seal member fails wherein said back up seal member solely precludes fluid leakage between said ball and said valve plate.

12. A strainer according to claim 11, wherein said primary seal members are accessible from said chambers for removal and replacement without breaking the integrity of the fluidtight engagement between said ball and said back up seal.

13. A strainer according to claim 7, includes seal means mounted on and extending about the outer periphery of each of the valve seat plates, the seal means engaging the housing to preclude fluid leakage between the valve seat plates and the housing, the valve seat plates being secured in fixed relation to said housing.

14. A strainer for trapping particles entrained in a fluid flowing through the strainer comprising:
a housing having means defining a first chamber and a second chamber,
the housing having means defining an inlet and an outlet to provide fluid to, and to convey fluid from, the chambers;
strainer means mounted in each of the chambers to strain fluid flowing through the chambers;
a user actuated, directional flow control valve means inserted in fluid communication between the inlet and said chambers,
the control valve means including a pair of opposed, parallel, valve seat plates, each having a central aperture therein and a flow directing means therebetween,
one of the valve seat plates having an outer side in fluid communication with the first strainer means container chamber,
the other valve seat plate having an outer side in fluid communication with the second strainer means containing chamber,
the inner sides of the valve seat plates being separated by a distance less than the width of the flow directing means,
the flow directing means being received by the apertures in the valve plates and being located between and movably supported by the valve seat plates,
fluid flow from the inlet to the chambers occurring only through the central apertures of the valve plates when fluid communication is established between of flow directing means and the central apertures of the valve plates,
the control valve means directing fluid flow from the inlet to one or the other or both chambers to cause fluid flow through the strainer means; and
another valve means inserted in fluid communication between each of said chambers and said outlet,
said another valve means automatically opening to permit fluid communication between the associated chamber and the outlet only when the fluid pressure in the associated chamber exceeds the fluid pressure in the outlet by a predetermined degree, wherein strained fluid can flow from one or the other or both of the chambers into the outlet.

15. A strainer according to claim 14, wherein said directional flow control valve means is constituted by a ball valve having a multi-ported ball member rotatable through a plurality of positions, rotation of the ball member providing fluid flow from the inlet, via the ports of the ball member, into one or the other or both of the first and second chambers provided by the housing.

16. A strainer according to claim 14, wherein said another valve means is constituted by normally closed check valve means permitting fluid flow from the chambers to the outlet, and precluding fluid flow from the outlet into either of the chambers.

17. A strainer for trapping particles entrained in a fluid flowing through the strainer comprising:
a housing having means defining a first chamber and a second chamber,
the housing having means defining an inlet and an outlet to provide fluid to, and to convey fluid from, the chambers,
the chambers being generally cylindrical and lying in spaced, side-by-side relationship along generally parallel chamber axes;
strainer means mounted in each of the chambers to strain fluid flowing through the chambers;
a user actuated ball valve mechanism positioned between the cylindrical chambers at one end thereof,
the ball valve mechanism including a multi-ported ball member rotatable on a ball axis parallel to the chamber axes,
the inlet being in fluid communication with the ball valve mechanism wherein fluid flow is directed, via the ports of the ball member, from the inlet to one or the other or both of the chambers, depending upon the rotational position of the ball, wherein fluid flows through the strainer means, a pair of opposed, parallel, valve seat plates, each having a central circular aperture therein, one of the valve seat plates having an outer side in fluid communication with the first strainer means containing chamber, the other valve seat plate having an outer side in fluid communication with the second strainer means containing chamber, the ball member being received by the circular apertures in the valve plates and being located between and rotatably supported by the valve seat plates, fluid flow from the inlet to the chambers occurring only through central apertures of the valve plates when fluid communication is established between ports of ball member and the central apertures of the valve plates.

* * * * *